(12) United States Patent
Hernich et al.

(10) Patent No.: US 11,550,787 B1
(45) Date of Patent: Jan. 10, 2023

(54) DYNAMIC GENERATION OF MATCH RULES FOR REWRITING QUERIES TO USE MATERIALIZED VIEWS

(71) Applicant: Amazon Technologies, Inc., Seattle, WA (US)

(72) Inventors: Andre Hernich, Berlin (DE); Vuk Ercegovac, Campbell, CA (US); Gaurav Saxena, Cupertino, CA (US); Panagiotis Parchas, Berlin (DE); Yannis Papakonstantinou, La Jolla, CA (US); Balakrishnan Narayanaswamy, San Jose, CA (US); Enrico Siragusa, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/118,307

(22) Filed: Dec. 10, 2020

(51) Int. Cl.
*G06F 16/2453* (2019.01)
*G06F 16/2455* (2019.01)

(52) U.S. Cl.
CPC .... *G06F 16/24539* (2019.01); *G06F 16/2455* (2019.01)

(58) Field of Classification Search
None
See application file for complete search history.

(56) References Cited

U.S. PATENT DOCUMENTS

| | | | |
|---|---|---|---|
| 7,089,225 B2 | 8/2006 | Li et al. | |
| 7,246,115 B2 | 7/2007 | Zhang et al. | |
| 7,406,469 B1 | 7/2008 | Thiyagarajan | |
| 7,440,963 B1 | 10/2008 | Bello et al. | |
| 7,853,604 B2 | 12/2010 | Thiyagarajan et al. | |
| 2004/0122814 A1* | 6/2004 | Zhang | G06F 16/24556 |
| 2007/0208695 A1* | 9/2007 | Burger | G06F 16/24553 |
| 2010/0030731 A1* | 2/2010 | Gui | G06F 16/24542 |
| | | | 707/714 |
| 2011/0119310 A1* | 5/2011 | Kolovski | G06F 16/24564 |
| | | | 707/794 |
| 2011/0125696 A1* | 5/2011 | Wu | G06N 5/025 |
| | | | 706/47 |
| 2012/0254143 A1* | 10/2012 | Varma | G06F 40/30 |
| | | | 707/706 |
| 2014/0330804 A1* | 11/2014 | Bao | G06F 16/3338 |
| | | | 707/706 |
| 2021/0165783 A1* | 6/2021 | Deshpande | G06F 16/2282 |

* cited by examiner

*Primary Examiner* — Christopher J Raab
(74) *Attorney, Agent, or Firm* — S. Scott Foster; Kowert, Hood, Munyon, Rankin & Goetzel, P.C.

(57) ABSTRACT

Match rules for rewriting queries to use materialized views may be dynamically generated by a database system. A database system may generate rules that indicate whether a given query can use a materialized view and how to rewrite the given query to use the materialized view. A query may be received and the rules may be applied to the query to determine that the query can use the materialized view and to rewrite the query to use the materialized view. The rewritten query can then be executed.

20 Claims, 10 Drawing Sheets

DYNAMIC GENERATION OF MATCH RULES FOR REWRITING QUERIES TO USE MATERIALIZED VIEWS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

For example, data processing is often measured by the speed at which requests to access data are performed. Many types of data access requests require intensive computational and storage access workloads. As data stores may have to process high workload access requests, techniques that reduce computational load, such as techniques that provide materialized views, may be implemented.

Figure 1:
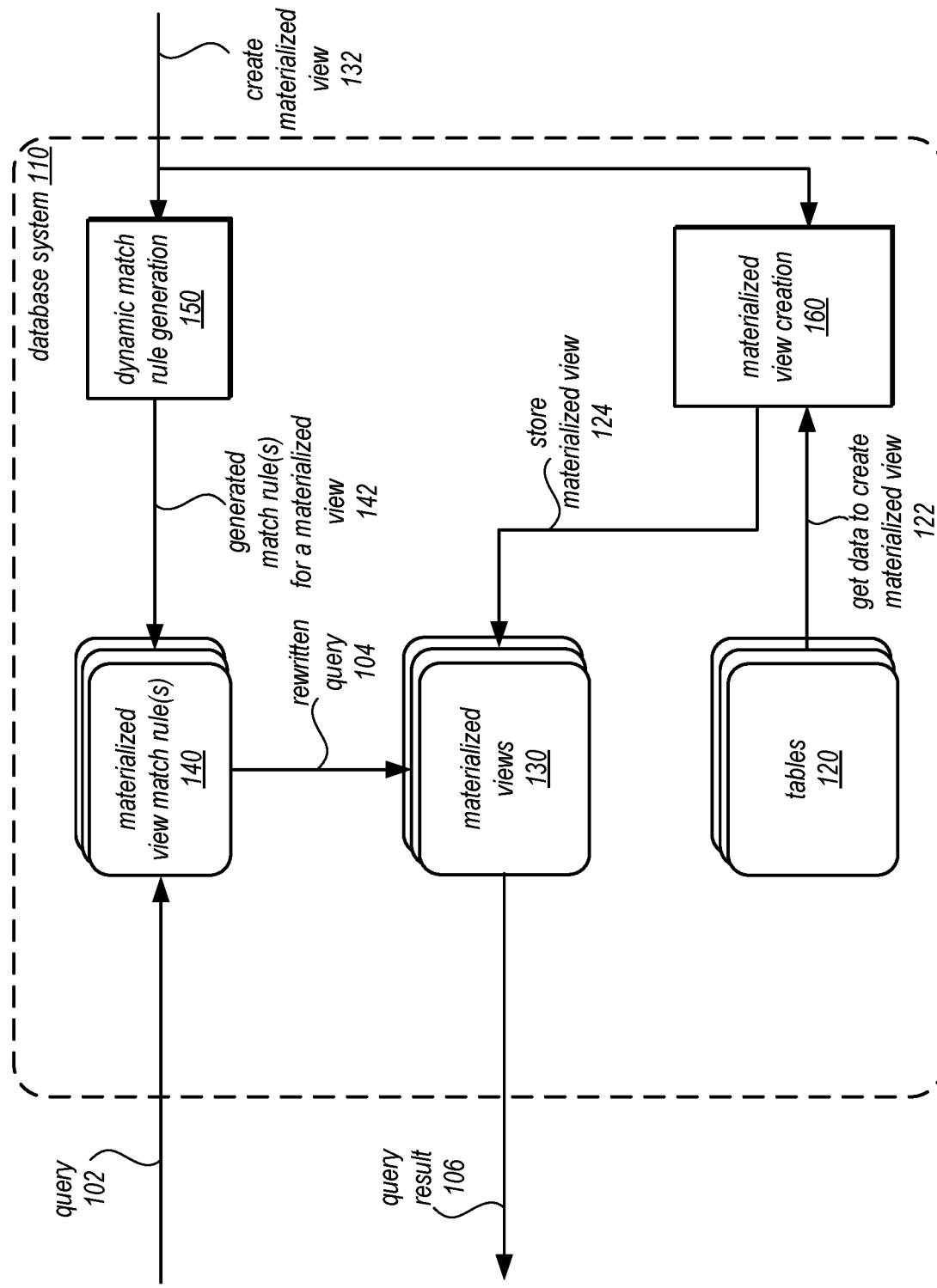
FIG. 1 is a logical block diagram illustrating dynamic generation of match rules for rewriting queries to use materialized views, according to some embodiments

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for dynamic generation of match rules for rewriting queries to use materialized views are described herein. Materialized views may be created for databases to offer a performance benefit to client applications because the results of a query stored as a materialized view may not have to be performed again in order to obtain information already found in the materialized view, in various embodiments. For example, instead of submitting the same query to database, the query may be submitted once to create the materialized view to obtain information. Then when the information is desired again, a query may be directed to the materialized view which already stores the information, saving computing resources to find, evaluate, combine, and/or otherwise process database data into a result for the query (or a query that is based on or could use the result of the query that is used to create the materialized view).

In some embodiments, materialized views may be used to handle queries that do not directly reference or include a materialized view. For example, a client application may not reference a materialized view because the existence of the materialized view may be unknown for that client application or may have been created more recently. Since a query Q may be composed of multiple operators, some of those operators can be replaced by another, equivalent query Q' (which uses one or more materialized views), thereby increasing the performance of the original query automatically without a client application having to specify the use of materialized views, in various embodiments.

In order to take advantage of the opportunity to rewrite queries using materialized views, dynamic generation of match rules for rewriting queries may provide different rules that are dynamically tailored to identify when different materialized views can be used for a query as well as how to rewrite the query to use the materialized view, in various embodiments. Match rules can be created prior to and/or without the benefit of the queries that can utilize the materialized view. In this way, new queries that, for example, that have not been received, or are otherwise original or different from previously received queries can still take advantage of the performance benefits offered by a materialized view as the match rules may not be generated for any one specific query and thus may be applicable to queries that have not been received before. Moreover, as more materialized views may be created over time, the dynamic generation of match rules may automatically update the capability of the database system to take advantage of newly created materialized views to enhance query performance.

FIG. 1 is a logical block diagram illustrating dynamic generation of match rules for rewriting queries to use materialized views, according to some embodiments. Database system 110 may be various types of databases (e.g., relational, non-relational, or other types of data stores) that offer the creation and querying of materialized views, such as materialized views 130. A request to create a materialized view 132 may be received at database system 110. Database system 110 may implement materialized view creation 160, which may get data 122 from source table(s) 120 as described in a materialized view definition and store 124 the materialized view 130.

As part of creating a materialized view, database system 110 may implement dynamic match rule generation 150. Dynamic match rule generation 150 may generate corresponding match rules, as indicated at 142. These materialized view match rule(s) 140 may then be stored for use in handling queries. As discussed in detail below with regard to FIG. 7, in some embodiments, a generic rule system (e.g., that includes different rules that describe how to generate match rule(s) for identification and query rewriting according to the operators used to generate a materialized view according to the materialized view definition) or other dynamic match rule generation configuration may be used to generate specific match rules for the materialized view 130. For example, dynamic match rule generation 150 may generate match rules 142 according to various scans, filters, joins, aggregations, or other operators used to create materialized view 130.

Figure 6:
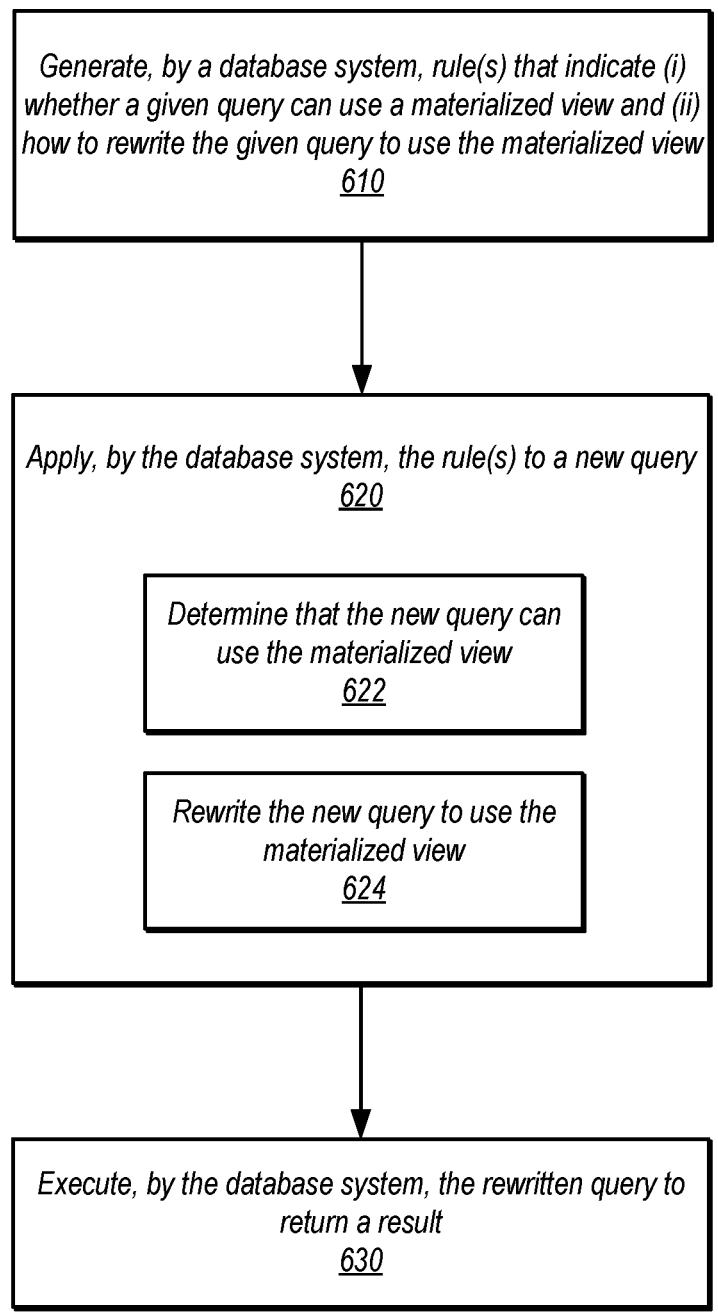
FIG. 6 is a high-level flowchart illustrating methods and techniques to implement dynamic generation of match rules for rewriting queries to use materialized views, according to some embodiments.
Figure 8A:
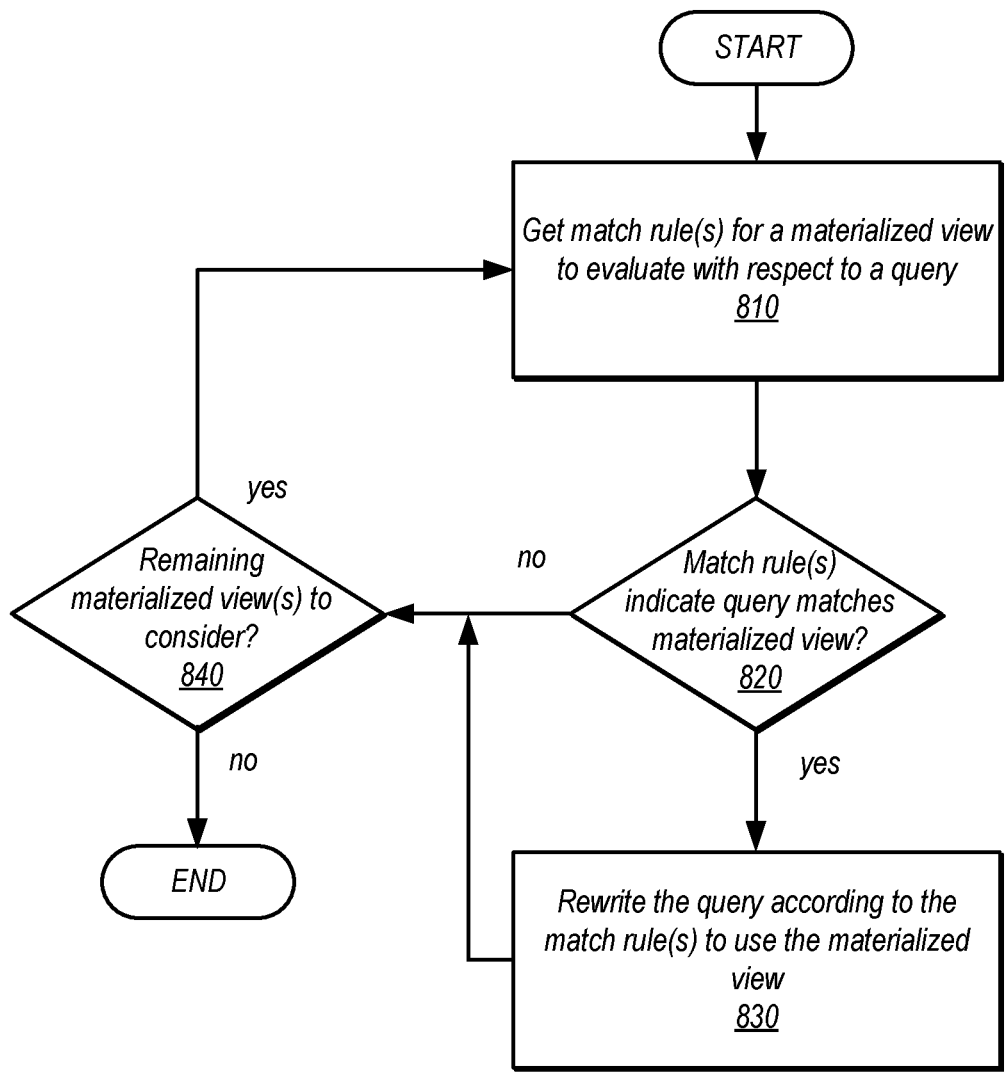
FIGS. 8A-8B are high-level flowcharts illustrating methods and techniques to implement evaluating match rules for materialized views, according to some embodiments.

When a query is received, such as query 102, materialized view match rule(s) 140 may be applied to detect materialized views that can be used to perform the query, as discussed in detail below with regard to FIGS. 6 and 8A and 8B. For example, match rule(s) 140 may identify features of a query covered by a materialized view (e.g., data from a same table 120 targeted by the query), and then be applied to rewrite the query (e.g., a portion or all of the query) to use the materialized view 130 corresponding to the materialized view match rule(s) 140, as indicated by rewritten query 104. In this way, a query result 106 can be returned that is generated using a materialized view 130 (e.g., for some or all of query result 106), providing a faster query performance. Different techniques for considering multiple materialized views may be implemented, such as those discussed below with regard to FIGS. 8A and 8B, which may rewrite a query multiple times using multiple match rules to use multiple different materialized views or generated different versions of a query using different match rules and materialized views to select one version of the query to execute (e.g., based on cost optimization or other performance analysis techniques).

Please note that the previous description of a database, table, materialized view, match rule, and various interactions are logical descriptions and thus is not to be construed as limiting as to the implementation of these features.

This specification begins with a general description of a provider network that implements database services (or other data storage or processing services) that may implement using computer resources to perform database queries and implement materialized views, including dynamic generation of match rules for rewriting queries to use materialized views. Then various examples of one such database service, including different components/modules, or arrangements of components/module that may be employed as part of implementing the techniques are discussed. A number of different methods and techniques to implement dynamic generation of match rules for rewriting queries to use materialized views, some of which are illustrated in accompanying flowcharts, are then discussed. Finally, a description of an example computing system upon which the various components, modules, systems, devices, and/or nodes may be implemented is provided. Various examples are provided throughout the specification.

Figure 2:
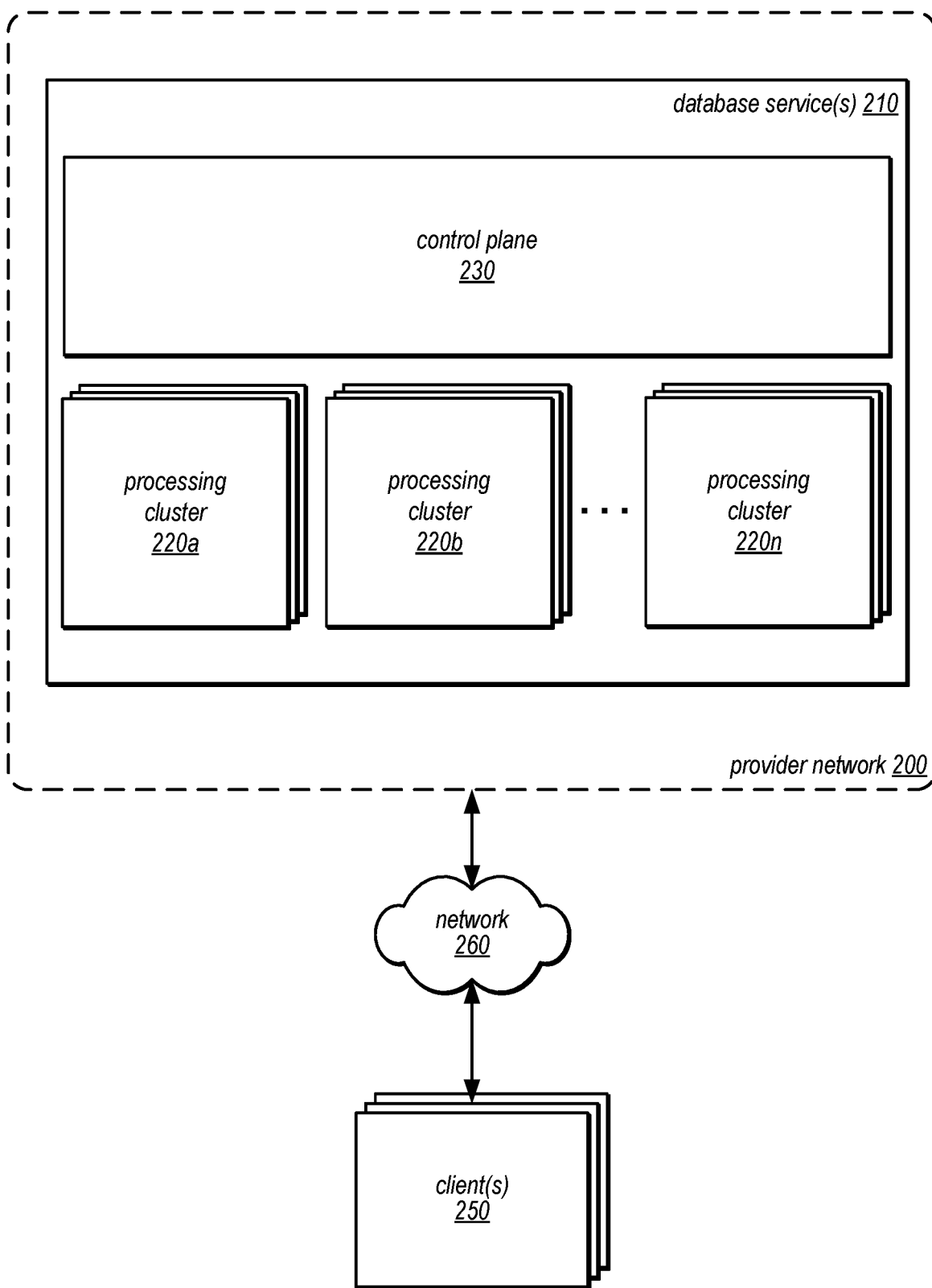
FIG. 2 is a logical block diagram illustrating a provider network offering a database service that provides materialized views for databases hosted in the database service, according to some embodiments.

FIG. 2 is a logical block diagram illustrating a provider network offering a database service that provides materialized views for databases hosted in the database service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as database service(s) 210 or other data processing services, (e.g., a map reduce service, a data warehouse service, and other large scale data processing services) and/or any other type of network based services (which may include a virtual compute service and various other types of storage, processing, analysis, communication, event handling, visualization, data cataloging, data ingestion (e.g., ETL), and security services not illustrated), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of database service(s) 210 may be implemented by a particular node or may be distributed across several nodes. In some embodiments, a given node may implement the functionality of more than one service system component (e.g., more than one data store component).

Database services 210 may be various types of data processing services that perform general or specialized data processing functions (e.g., analytics, big data querying, or any other type of data processing operation) over data that is stored across multiple storage locations, in some embodiments. For example, in at least some embodiments, database services 210 may include various types of database services (e.g., relational) for storing, querying, and updating data. Such services may be enterprise-class database systems that are scalable and extensible. Queries may be directed to a database in database service(s) 210 that is distributed across multiple physical resources, as discussed below, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

In some embodiments, database service(s) 210 may include services that process requests to data that is not stored in fully structured storage (e.g., non-relational or NoSQL databases). Database services 210 may access the data that is semi-structured or not-structured in storage, such as data objects of unstructured or semi-structured data in a separate data storage service (not illustrated), in one embodiment. In other embodiments, database services 210 may locally store, managed, and access semi-structured or not-structured data (e.g., an object-based and/or key-value data store that stores tables joined with tables in other services, such as database service(s) 210 or the same storage service).

Generally speaking, clients 250 may encompass any type of client that can submit network-based requests to provider network 200 via network 260, including requests for database service(s) (e.g., a request or other query to a database in database services 210, etc.). For example, a given client 250 may include a suitable version of a web browser, or may include a plug-in module or other type of code module that can execute as an extension to or within an execution environment provided by a web browser. Alternatively, a client 250 may encompass an application, such as a database application (or user interface thereof), a media application, an office application or any other application that may make use of database services 210 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture. In some embodiments, clients of database service(s) 210 may be internal to or implemented as part of provider network 200 (e.g., on another provider network service not illustrated).

In some embodiments, a client 250 may provide access to provider network 200 to other applications in a manner that is transparent to those applications. For example, client 250 may integrate with an operating system or file system to provide storage on one of database service(s) 210 (e.g., a database table that stores data on behalf of the operating system or file system). However, the operating system or file system may present a different storage interface to applications, such as a conventional file system hierarchy of files, directories and/or folders. In such an embodiment, applications may not need to be modified to make use of the storage system service model. Instead, the details of interfacing to database service(s) 210 may be coordinated by client 250 and the operating system or file system on behalf of applications executing within the operating system environment. Similarly, a client 250 may be an analytics application that relies upon database services to execute various queries for data already ingested or stored in the database service 210 or data stored in a data lake hosted in other storage service(s) in provider network 200 that may be accessible to a query engine implemented as part of database service(s) 210.

Clients 250 may convey network-based services requests (e.g., access requests to read or write data) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In at least some embodiments, a database service 210 may be a data warehouse service or other database that stores data across multiple storage locations (e.g., across different nodes in a processing cluster). In such scenarios a data warehouse service, may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data, in one embodiment. A client's use for the data may also affect the configuration of the data management system used to store the data. For instance, for certain types of data analysis and other operations, such as those that aggregate large sets of data from small numbers of columns within each row, a columnar database table may provide more efficient performance, in one embodiment. In other words, column information from database tables may be stored into data blocks on disk, rather than storing entire rows of columns in each data block (as in traditional database schemes). The following discussion describes various embodiments of a column-oriented (sometimes referred to as "columnar") database service (e.g., such as data warehouse service). However, various versions of the components discussed below as may be equally adapted to implement embodiments for various other types of systems, such as row-oriented database systems. Therefore, the following examples are not intended to be limiting as to various other types or formats of structured data that may be stored, accessed, or otherwise managed by database service 210.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 210 may be implemented by a large collection of computing devices, such as customized or off-the-shelf computing systems, servers, or any other combination of computing systems or devices, such as the various types of systems 1000 described below with regard to FIG. 9, in some embodiments. Different subsets of these computing devices may be controlled by control plane 230. Control plane 230, for example, may provide an interface to clients or users who wish to interact with the processing clusters 220 managed by control plane 230. For example, the interface may implement one or more Application Programming Interfaces (APIs) to allow client systems to programmatically invoke database service operations, functions, or other features and/or the interface may implement or provide one or more graphical user interfaces (GUIs) for storage clients (e.g., as a web-console). The interface may allow clients to select various control functions offered by database service 210 for the processing clusters 220 hosted in the database service 210, in some embodiments. For example, a user may make adjustments to workload allocations, prioritization schemes, cluster size, network mappings or other operations or tasks for performing a query.

In at least some embodiments, control plane 230 may implement cluster performance monitoring, which may track, store, organize and/or evaluate performance metrics collected for queries performed at processing clusters 220. For example, performance monitoring may receive reported metrics from a leader node, and store them in a common storage location (e.g., in a file, direct, or object within a storage service) for the database (or user account associated with the database). In some embodiments, performance monitoring may evaluate processing cluster performance in order to trigger the performance of various control plane 230 operations (e.g., node replacement or failover operations). In some embodiments, cluster scaling may be implemented as part of control plane 230 to respond to user requests to add or remove node from a processing cluster or automatically triggered requests/events to add or remove nodes (e.g., based on utilization thresholds for processing, storage, network, or other cluster resource).

Various clients (or customers, organizations, entities, or users) may wish to store and manage data using database service 210, in some embodiments. Processing clusters, such as processing clusters 220a, 220b, and 220n may respond to various requests, including write/update/store/redistribute requests (e.g., to add data into storage), requests to create materialized views, or other queries for data (e.g., such as a Server Query Language request (SQL) for particular data), as discussed below with regard to FIG. 3, along with many other data management or storage services, in some embodiments. Queries may be directed to data that is locally hosted as part of database service 210 or stored elsewhere that is fully structured data or queries directed to data that is not-structured, such as log records, event data, or machine generated data stored in another storage service, in some embodiments.

Multiple users or clients may access a processing cluster 220 to obtain data warehouse services, in one embodiment. In at least some embodiments, a database service 210 may provide network endpoints to the clusters which allow the clients to send requests and other messages directly to a particular cluster. Network endpoints, for example, may be a particular network address, such as a URL, which points to a particular cluster, in one embodiment. For instance, a client may be given the network endpoint "http://mycluster.com" to send various request messages to. Multiple clients (or users of a particular client) may be given a network endpoint for a particular cluster, in one embodiment. Various security features may be implemented to prevent unauthorized users from accessing the clusters, in some embodiments. Conversely, a client may be given network endpoints for multiple clusters, in one embodiment.

Processing clusters 220 may provide an enterprise-class database query and management system that allows users to send data processing requests to be executed by the clusters 220, such as by sending a data processing request to a cluster control interface implemented by the processing clusters, in some embodiments. Processing clusters 220 may perform data processing operations with respect to data stored locally in a processing cluster. Requests sent to a processing cluster 220 may be directed to local data stored in the processing cluster, in some embodiments. Therefore, processing clusters may implement local data processing to plan and execute the performance of requests or other queries with respect to local data in the processing cluster in one embodiment. In some embodiments, the processing clusters may access or send processing instructions to data that is stored remote from and/or external to the processing clusters, such as data stored in another service.

Processing clusters 220 may allow users of database service 210 to perform data warehouse functions, such as fast querying capabilities over structured data, integration with various data loading and ETL (extract, transform, and load) tools, client connections with best-in-class business intelligence (BI) reporting, data mining, and analytics tools, and optimizations for very fast execution of complex analytic queries such as those including multi-table joins, subqueries, and aggregation, more efficiently, in various embodiments. In other embodiments, database service 210 and/or processing clusters 220 may offer query capabilities may query over other types of data (e.g., semi-structured data, unstructured data, various other kinds of data, such as media, or no-schema data).

Figure 3:
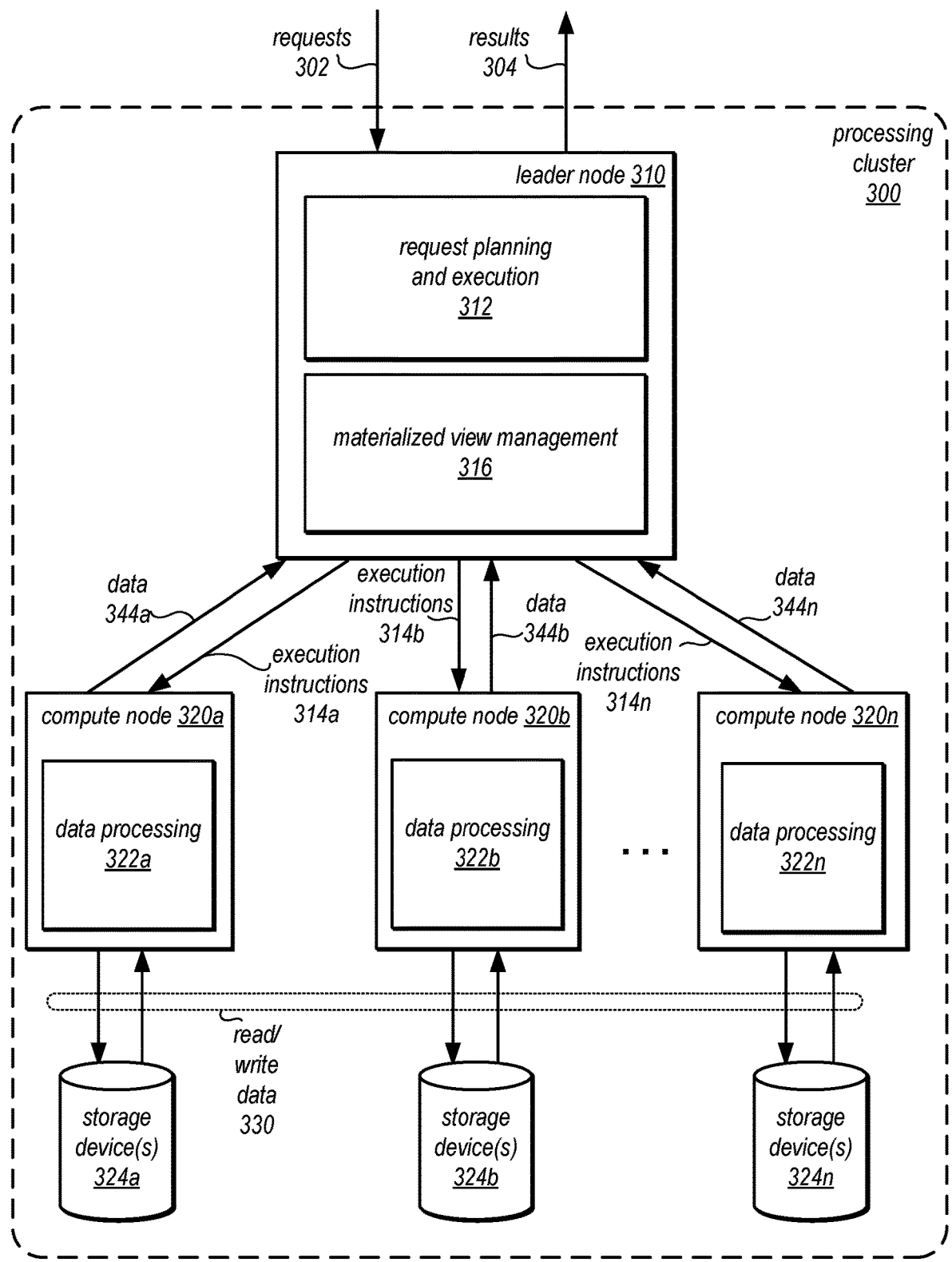
FIG. 3 is a logical block diagram illustrating a processing cluster of a database service that implements materialized view management and query rewriting to use materialized views, according to some embodiments.

FIG. 3 is a logical block diagram illustrating a processing cluster of a database service that implements materialized view management and query rewriting to use materialized views, according to some embodiments. Processing cluster 300 may be data warehouse service cluster, like processing clusters 220 discussed above with regard to FIG. 2, or another processing cluster that distributes execution of a query among multiple processing nodes, in one embodiment. As illustrated in this example, a processing cluster 300 may include a leader node 310 and compute nodes 320a, 320b, and 320n, which may communicate with each other over a network or other interconnect(not illustrated), in one embodiment. Leader node 310 may implement request planning 312 to generate plan(s) and instructions 314 for executing various requests 302, such as query, or requests to update, add, modify, or remove data, on processing cluster 300, in one embodiment.

For example, request planning and execution 312 may implement various features to handle requests directed to or requests that may be rewritten to use a materialized view, as discussed in detail below with regard to FIG. 5. A created materialized view may be provided by creating internal table(s) that cannot be directly referenced or accessed by a query (and a compensation view in some scenarios), in some embodiments. However, in other embodiments, when a request to create a materialized view is received, a table or other data structure that stores the materialized view that can be directly referenced and accessed by a query may be created.

Leader node 310 may implement materialized view management 316, discussed in detail below with regard to FIG. 4, to create and update materialized views. Leader node 310 may also implement metric planning history/performance metric collection (not illustrated) to collect and report performance metrics collected for various events, units of work, or other portions a query or other operation's performance, compute node or leader node performance, and history of operations performed, in some embodiments. As described herein, each node in a processing cluster 300 may include attached storage, such as storage device(s) 324a, 324b, and 324n, on which a database, including tables and materialized views (or portions thereof) may be stored on behalf of clients (e.g., users, client applications, and/or storage service subscribers), in one embodiment.

Note that in at least some embodiments, data processing capability may be separated from compute nodes, and thus in some embodiments, additional components may be implemented for processing requests. Additionally, it may be that in some embodiments, no one node in processing cluster 300 is a leader node as illustrated in FIG. 3, but rather different nodes of the nodes in processing cluster 300 may act as a leader node or otherwise direct processing of requests to data stored in processing cluster 300, in one embodiment. While nodes of processing cluster may be implemented on separate systems or devices, in at least some embodiments, some or all of processing cluster may be implemented as separate virtual nodes or instance on the same underlying hardware system (e.g., on a same server).

Leader node 310 may manage communications with clients, such as clients 250 discussed above with regard to FIG. 2, in one embodiment. For example, leader node 310 may be a server that receives a request (e.g., a query for data or a request to add data) 302 from various client programs (e.g., applications) and/or subscribers (users), then parses them and develops an execution plan (e.g., query plan(s)) to carry out the associated database operation(s), as discussed in detail below with regard to FIG. 5.

Leader node 310 may develop the series of steps necessary to obtain results for a request 302, in one embodiment. Request 302 may be a query directed to a database table that is stored within processing cluster 300 (e.g., at one or more of compute nodes 320), in one embodiment. Leader node 310 may also manage the communications among compute nodes 320 instructed to carry out database operations for data stored in the processing cluster 300, in one embodiment. For example, node-specific request instructions 314 may be generated or compiled code that is distributed by leader node 310 to various ones of the compute nodes 320 to carry out the steps needed to perform a query or other operation in request 302, including executing the code to generate intermediate results of request 302 at individual compute nodes that may be sent back to the leader node 310, in one embodiment. Leader node 310 may receive data and responses or results (e.g., data 344a, 344b, and 344c) from compute nodes 320 in order to determine a final result for a request, in one embodiment. A database schema, data format and/or other metadata information for the data stored among the compute nodes, such as the data tables stored in the cluster, may be managed and stored by leader node 310 or obtained from a separate store (e.g., a data catalog service), in some embodiments. Request planning 312 may include the generation and selection of a plan to perform requests 302, in some embodiments.

Processing cluster 300 may also include compute nodes, such as compute nodes 320a, 320b, and 320n. Compute nodes 320, may for example, be implemented on servers or other computing devices, such as those described below with regard to computer system 1000 in FIG. 9, and each may include individual query processing "slices" defined, for example, for each core of a server's multi-core processor, one or more data processing engine(s), such as data processing 322a, 322b, and 322n, to execute the instructions 314 or otherwise perform the portions of the request plan assigned to the compute node, in one embodiment. Data processing 322 may access a certain memory and disk space in order to process a portion of the workload for a request that is sent to one or more of the compute nodes 320. Data processing 322 may access attached storage, such as 322a, 322b, and 322n, to perform operation(s), in one embodiment. For example, data processing 322 may scan data in attached storage 324, access indexes, perform joins, semi joins, aggregations, or any other processing operation assigned to the compute node 320, in one embodiment. Compute nodes 320 may send intermediate or final results from requests back to leader node 310 for final result generation (e.g., combining, aggregating, modifying, joining, etc.). Data, such as a database table or materialized view, may be partitioned or otherwise distributed across the storage device(s) 324 as different partitions or shards of the data, in some embodiments. Compute nodes 320 may receive instructions specific to the shard(s) or partition(s) of the data to which the compute node 320 has access. Compute nodes 320 may implement metrics collection agents (not illustrated) in order to obtain the various performance metrics that may be collected for performing performance analysis for query planning, optimization, and execution of subsequent database queries.

Storage device(s), such as storage devices 324a, 324b, and 324n, may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 4:
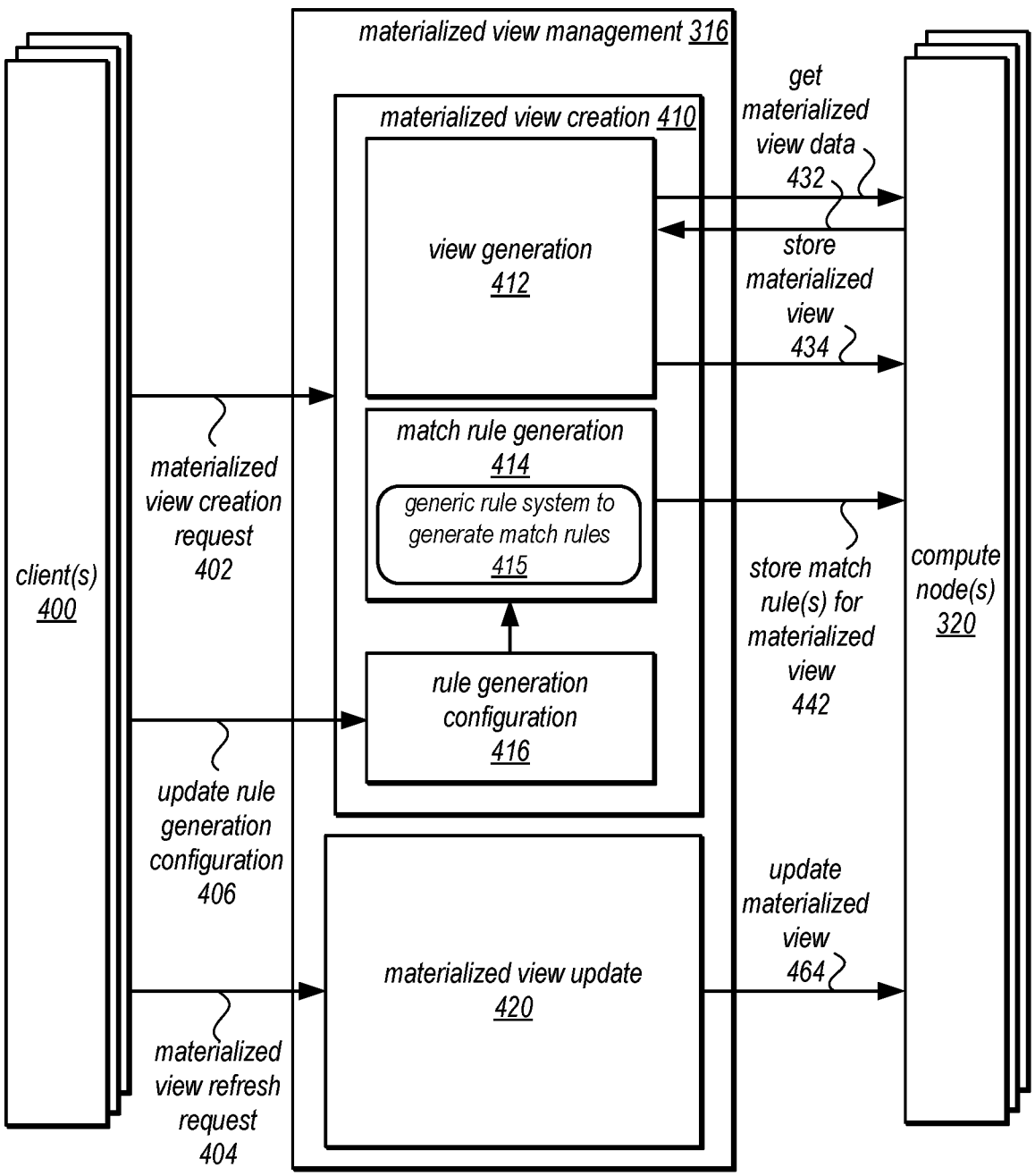
FIG. 4 is a block diagram illustrating materialized view management that implements materialized view creation that generates match rules for rewriting queries to use materialized views, according to some embodiments.

FIG. 4 is a block diagram illustrating materialized view management that implements materialized view creation and update, according to some embodiments. Materialized view management 316 may perform various operations to create and update materialized views created from a database. Although illustrated as part of processing cluster 300 in FIG. 3, some or all features of materialized view management 316 may be implemented using separate resources (e.g., as a separate microservice within database service(s) 210. As illustrated in FIG. 4, materialized view creation 410 may be implemented to handle requests related to the creation and management of materialized views from a client, such as client(s) 400. Client(s) 400, which may be similar to client(s) 250, may submit requests via an interface (e.g., to a network endpoint for a processing cluster using a connection, such as JDBC or ODBC as discussed above or a programmatic interface such as an API, a command line interface and/or graphical user interface, such as a console for database service(s) 210) to submit a request to create a materialized view, as indicated at 402.

Materialized view management 316 may handle (or dispatch to other components, such as compute node(s) 320), various operations to generate the materialized view as part of view generation 412. For example, view generation 412 may parse or analyze a view definition received as part of materialized view creation request 402 (e.g., stated as a query in SQL) and direct the perform of various operations to get, as indicated at 432, materialized view data from source tables specified in the materialized view definition (e.g., by generating and sending instructions according to plan or procedure generated to create the materialized view). The materialized view data may then be stored, as indicated at 434 for subsequent access (e.g., at storage devices attached to or accessible to compute node(s) 320). For example, a materialized view may be stored as a table.

Match rule generation 414 may also be performed as part of materialized view creation 410. For example, the match rule generation techniques, as discussed in detail below with regard to FIG. 7, may be used to apply generation rules according to a generic rules system to generate match rules 415. For example, a generic rules system may specify various template rules which may then be extended or modified according to the specific features of an operation in an operation tree (e.g., a rule template for a join operation may be extended or modified to specify the particular tables (or intermediate results from tables) being joined as part of rewrite rule). In various embodiments, rule generation configuration 416 may support requests to update or change versions of generic rule system to generate match rules 415. For example, different generations rules of generic rules system 415 may correspond to different operations, which may be assembled together to create a custom set of match rules dynamically generated for a particular materialized view. In some embodiments, different versions of generic rule system 415 may be supported. In such embodiments, requests to update a rule generation configuration 406 may be received which change or describe a different generic rule set 415 to be used or match rule generation 414. In some embodiments, a change to generic rule system 415 may trigger a re-generation of match rules for existing materialized views in order to have the match rules support additional operations which may, for example, be supported in a different generic rule system 415 (and thus in generated match rules) that was not supported in the generic rule system used to create the match rule sets.

The generated match rules may be stored, as indicated at 442 to materialized view metadata and/or other locations (e.g., which may be accessible for performing query rewriting as discussed below), such as at compute nodes 320. In some embodiments, the match rules may be encrypted or otherwise obscured to protect the features of a materialized view to which the match rules correspond.

As indicated at 420, materialized view management 316 may also support materialized view updates. For example, a command, instruction, or request to refresh a specified materialized view may be received, as indicated at 404. Materialized view update 420 may perform one or more operations to obtain updated data (e.g., similar to requests 432) and then update the materialized view 464. In some embodiments, materialized view update 420 may automatically refresh or update materialized views.

Figure 5:
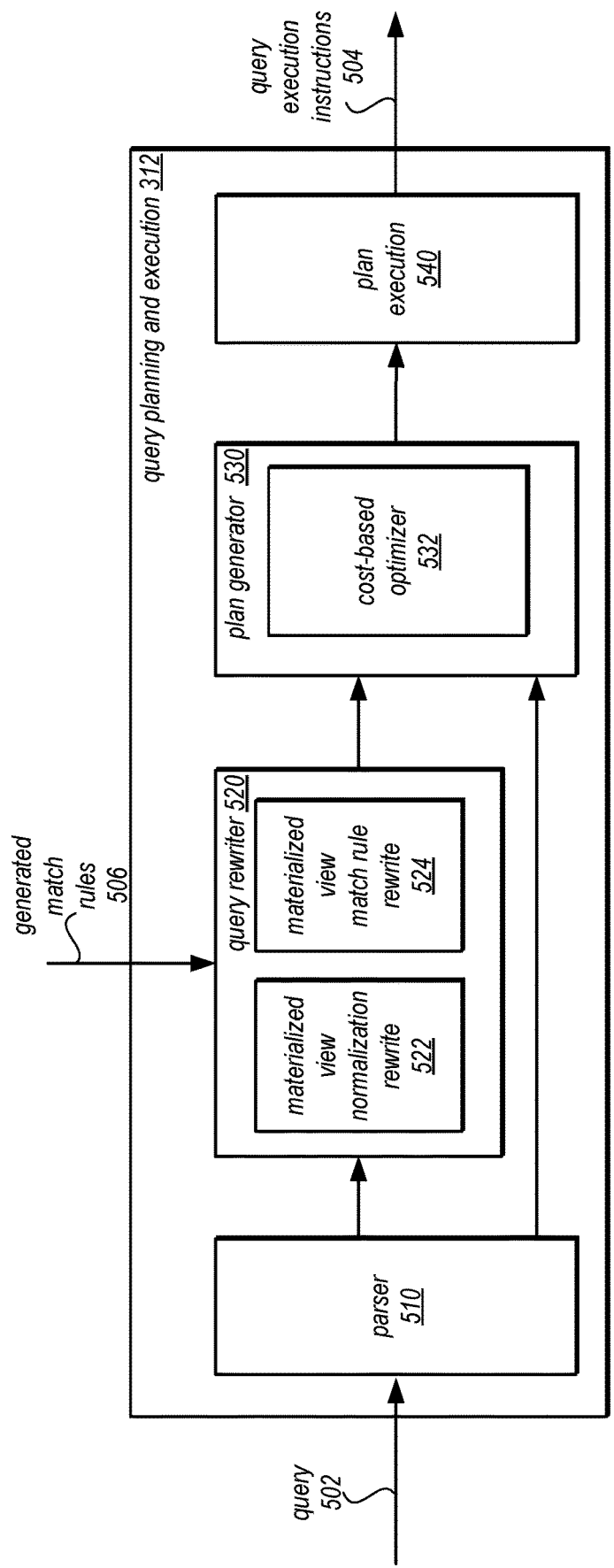
FIG. 5 is a block diagram illustrating query planning and execution that utilizes match rules to rewrite queries to use materialized views, according to some embodiments.

FIG. 5 is a block diagram illustrating query planning and execution that utilizes match rules to rewrite queries to use materialized views, according to some embodiments. Query planning and execution 312 may take advantage of generated match rules, stored as part of creating new materialized views in order to rewrite queries to utilize materialized views when able. For example, query planning and execution 312 may receive a query 502 at parser 510. Parser 510 may transform query 502 into a symbol tree or other format for rewriting, planning, and execution in various embodiments. For example, parser 510 may transform query 510 in algebraic form to describe the various features of the query. In some embodiments, parser 510 may perform various validity or other checks (e.g., of syntax, valid operators, functions, and/or parameters).

In various embodiments, query planning and execution 312 may implement query rewriter 520. Query rewriter 520 may include, in some embodiments, materialized view normalization rewrite 522. For example, materialized view normalization rewrite 522 may identify queries that do not include features that would match some materialized view(s) and rewrite the query so a materialized view could be used. For example, different relational algebra transformations may be applied to a parsed query 502 to identify single operations that may be replaced with multiple operations, by rewriting the query to expand or changing the ordering of operations to allow for the use of materialized view (e.g., pushing up filter operations, join operations, or other operations that would constrain or exclude the use of some materialized views). These normalization rewrites applied at 522 may still produce a same result as the original query (e.g., but in a less performant form without the use of materialized views), in some embodiments.

Query rewriter 520 may also apply generated match rules 506 for different materialized views in order to perform query rewrites for those queries that are indicated as able to use a materialized view according to a match rule, as discussed in detail below with regard to FIGS. 6 and 8. For example, match rules 506 may be written in relational algebra forma in order to describe the data stored in a materialized view. Match rules may then be compared or otherwise applied to the algebraic form of a query 502 in order to recognize matching expressions within the query 502. Match rules 506 may also specify how to transform or otherwise modify the algebraic form of the query to use the materialized view (e.g., by including operations to access and/or produce intermediate results from a materialized view which may be used to generate a query result). As discussed in detail below, multiple different materialized views may be considered until a matching materialized view is found, excluding subsequent materialized views from consideration, in one embodiment. In another embodiment, multiple rewrites of a query may be performed, such as a different rewrite corresponding to each matching materialized view (or a subset of matching materialized views that do not have coverage that overlaps with a materialized view already identified as matching for the materialized view). These multiple rewrites may all be included in the same rewritten query (e.g., rewrites to different portions of the query. In some embodiments, as discussed below with regard to FIG. 8B, each rewrite to a query may be a different candidate version of the query from which a selection may be made to choose a most performant (e.g. least costly) rewritten version of the query.

Query planning and execution 312 may implement plan generator 530 which may take the rewritten query (or multiple candidate rewritten queries using different materialized view) as well as non-rewritten query that does not utilize materialized views and generate one or more query plans. For example, the query plans may include different orderings of operations to execute the query using the materialized view in order to determine different optimizations for query execution. In some embodiments, plan generator may implement cost-based optimizer 532, which may select between multiple query plans using materialized views (and not using materialized views) to determine the least costly (e.g., fastest performing) query plan. The selected query plan may then be provided to plan execution 540, which may generate and send various query execution instructions 504 to compute nodes, as discussed above with regard to FIG. 3.

Although FIGS. 2-5 have been described and illustrated in the context of a database service, like a data warehouse service implementing a columnar relational database table, the various components illustrated and described in FIGS. 2-5 may be easily applied to other database or data storage systems that provide materialized views of database data. As such, FIGS. 2-5 are not intended to be limiting as to other embodiments of a storage engine, query engine, a single or distributed database engine or management system, processing cluster, or other component that may implement using computer resources to perform the creation and use of materialized views, including resources, hosts, systems, or devices that are separate from the query engine or database management system itself (e.g., an external data replication store or system). FIG. 6 is a high-level flowchart illustrating methods and techniques to implement dynamic generation of match rules for rewriting queries to use materialized views, according to some embodiments. Various different systems and devices may implement the various methods and techniques described below, either singly or working together. For example, a processing cluster, such as described above with regard to FIGS. 2-5 may implement the various methods. Alternatively, a combination of different systems and devices may implement the described techniques. Therefore, the above examples and or any other systems or devices referenced as performing the illustrated method, are not intended to be limiting as to other different components, modules, systems, or configurations of systems and devices.

As indicated at 610, a database system may generate one (or more) rules that indicate (i) whether a given query can use a materialized view and (ii) how to rewrite the given query to use the materialized view, in some embodiments. For example, as discussed in detail below with regard to FIG. 7, materialized views may be generated according to a materialized view definition, which may include various data sources (e.g., tables), operations applied to those sources and/or the results of other operations. The generated rule(s) may be able to describe the respective sources, as well as operations applied to those sources, in order to be useable to indicate whether a given query can use the materialized view (e.g., by specifying a rule that indicates query target=source A and source B), as well as the operations that may be applied, such as a filter operation applied to source A, and so on. For example rules may incorporate or specify materialized view features and rewrites as relational algebra expressions. In some embodiments, rules may be specified in scripts or other human readable notation (e.g. Javascript Object Notation (JSON)). Rules to rewrite a query may, for instance, indicate which operations, functions, predicates, or other feature in a query to replace, in various embodimetns. For example, instead of "SELECT*FROM Table_A WHERE Table_A.X>20" the predicate and the source may be replaced with a materialized view which already filters Table_A.X>20, so that the rewrite directs the rewritten query to be "SELECT*FROM Mv_A."

Once generated, the rule(s) may be used to handle the execution of queries. As discussed in detail below with regard to FIG. 8, multiple materialized views may be created, so multiple different rules(s) corresponding to different materialized views may be applied. As indicated at 620, the database system may apply the rule(s) to a new query received at the database system, in some embodiments. The application of the rule may be indicate that the new query can use the materialized view, as indicated at 622, and rewrite the new query to use the materialized view, as indicated at 624.

As indicated at 630, the rewritten query may be executed to return a result for the query, in some embodiments. For example, "SELECT*FROM Mv_A" may be executed (instead of "SELECT*FROM Table_A WHERE Table_A.X>20"). As the materialized view may store results that were already computed, some of the computational workload for the query may be removed, allowing performance of the new query to increase over performance of the query without using the materialized view (e.g., the query executed faster). In some embodiments, multiple rewrites may be performed to a query before the query may be executed. As discussed above with regard to FIG. 5, in some scenarios, a rewritten query may be more costly than a non-rewritten query (e.g., as determined by a cost optimizer), and therefore the non-rewritten query may be executed instead. In other embodiments, multiple candidate versions of a rewritten query using different materialized views may be considered.

Figure 7:
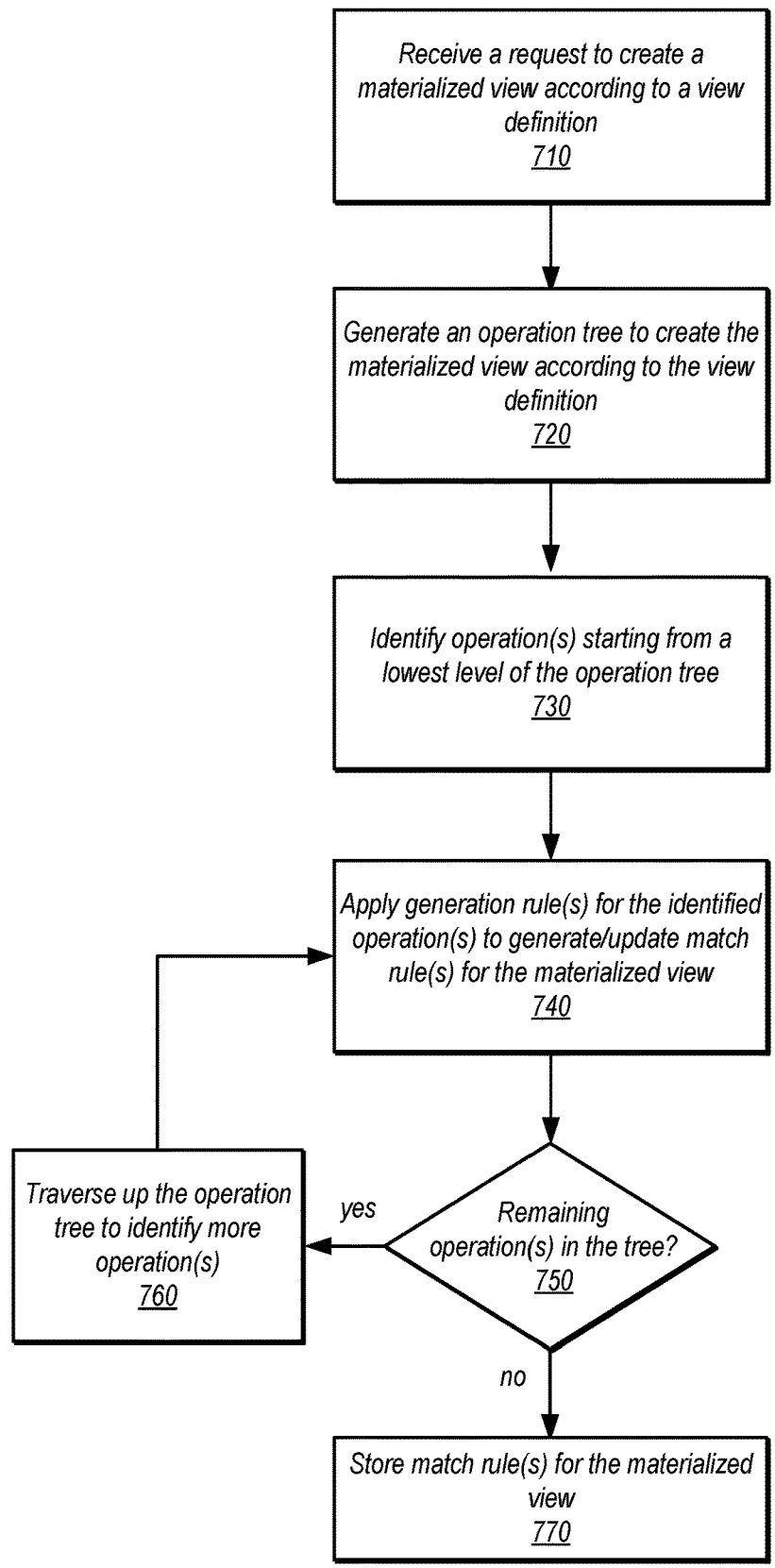
FIG. 7 is a high-level flowchart illustrating methods and techniques to implement generating match rules from a view definition, according to some embodiments.

Different techniques for generating match rules may be performed. In some embodiments, dynamic generation techniques may be applied from the view definition provided for creating the materialized view. FIG. 7 is a high-level flowchart illustrating methods and techniques to implement generating match rules from a view definition, according to some embodiments. As indicated at 710, a request to create a materialized view may be received according to a view definition, in some embodiments. For example, a command may be received via a command line, graphical user interface or API that specifies a view definition to create a materialized view. In some embodiments, the view definition may be specified using a query language, such as SQL, and may be stated as a query.

As indicated at 720, an operation tree may be generated to create the materialized view according to the view definition, in some embodiments. For example, the view definition may be parsed into different operations and a symbol tree created describing the different operations as well as the relationship between the operations as modeled by the location of the operations within the tree as well as the links between operations in the operation tree.

As indicated at 730, in some embodiments, one or more operation(s) may be identified starting from a lowest level of an operation tree. For example, the leaf nodes of the operation tree (or the leaf node) may represent initial or first operations to perform to create the materialized view (e.g., a scan operation of a respective data source). For identified operation(s), corresponding generation rule(s) (e.g., from a generic rule system) for the identified operations maybe applied to generate or update match rule(s) for the materialized view, in some embodiments. For example, each operation may have a corresponding generation rule, which indicates how to specify a match and/or rewrite based on that operation to create the materialized view being considered. In the case of a scan, for example, a generation rule may create a match rule that identifies a query target to equal or otherwise match the source being scanned (e.g., the table being scanned).

Match rules may be continue be generated to add to or update match rule(s) for the materialized view, in various embodiments. For example, as indicated by the positive exit from 750, if more operations remain to be considered in the operation tree, then a traversal up the operation tree may be performed to identify more operation(s), as indicated at 760. For example, a join operation may be specified that joins data from two different sources identified in two lower level operations. Then, as indicated at 740, a corresponding generation rule for the identified operation(s) may be applied to generate or update the match rule(s). Such iterations may continue until no more operations remain in the operation tree. Then, as indicated at 770, the match rule(s) may be stored for the materialized view, in some embodiments. For example, metadata for the materialized view (e.g., in a storage location co-located with the contents of the materialized view) may be updated to include the match rules (or a pointer to a location where the match rules can be found). In some embodiments, an index or other structure for query handling to perform query rewrites may be updated to indicate that the match rules should be evaluated with respect to subsequent queries.

In some embodiments, rewrites to queries may be limited to using a single matching materialized view. For example, materialized views may be considered in various orders (as discussed in detail below) and when a matching materialized view is found, remaining materialized views may be excluded from consideration. In some embodiments, however, multiple rewrites to a query may be performed to use multiple materialized views. FIG. 8A is a high-level flowchart illustrating methods and techniques to implement evaluating match rules for materialized views, according to some embodiments.

As indicated at 810, match rule(s) for a materialized view may be retrieved to evaluate with respect to a query, in some embodiments. For example, match rule(s) for existing materialized views may be randomly selected. In some embodiments, materialized views may be considered in parallel, such that match rules for multiple different materialized views may be retried. In some embodiments, materialized views may be evaluated according to a determine order. For example, materialized views themselves can be ordered independently of the query to be rewritten based on how general they are. For example, a more specific materialized view may be more performant and therefore should be preferred over a more general materialized view that includes the more specific materialized view. Consider a scenario where a 'materialized_view_specific' exists that groups by (A) and a 'materialized_view_general' that groups by (A,B,C). If the query can be answered by 'materialized_view_specific', it should be preferred because it avoids flattening (aggregating) dimensions {B,C} that the usage of 'materialized_view_general' would require. Thus, 'materialized_view_specific' should be considered first.

In another example, a performance benefit for different materialized views may be determined for the received query to determine an order for evaluating materialized views. For example, a benefit function for each relevant materialized view may be utilized. A performance benefit can be determined or indicated in terms of query coverage (e.g., how much of the query is contained in the materialized view), materialized view size (e.g., the smaller the materialized view size the better) or a performance measurement that compares performance of a query with and without the use of the materialized view (e.g., using estimated performance times).

As indicated at 820, if the match rule(s) indicate that a query matches the materialized view (e.g., by satisfying various logical statements or other operations specified in the match rule, such as matching a source, operation with respect to sources, etc.), then, the query may be rewritten according to the match rule(s) to use the materialized view, as indicated at 830. If other materialized views remain to be considered (e.g., according to the ordering or according to random search that tracks which materialized views have been considered or not, then the evaluation may repeated, as indicated by the positive exit from 840 to 810. In this way, multiple rewrites to account for or use multiple materialized views may be identified and performed. When no more materialized views remain, rewriting of the query may end, as indicated by the negative exit from 840.

Figure 8B:
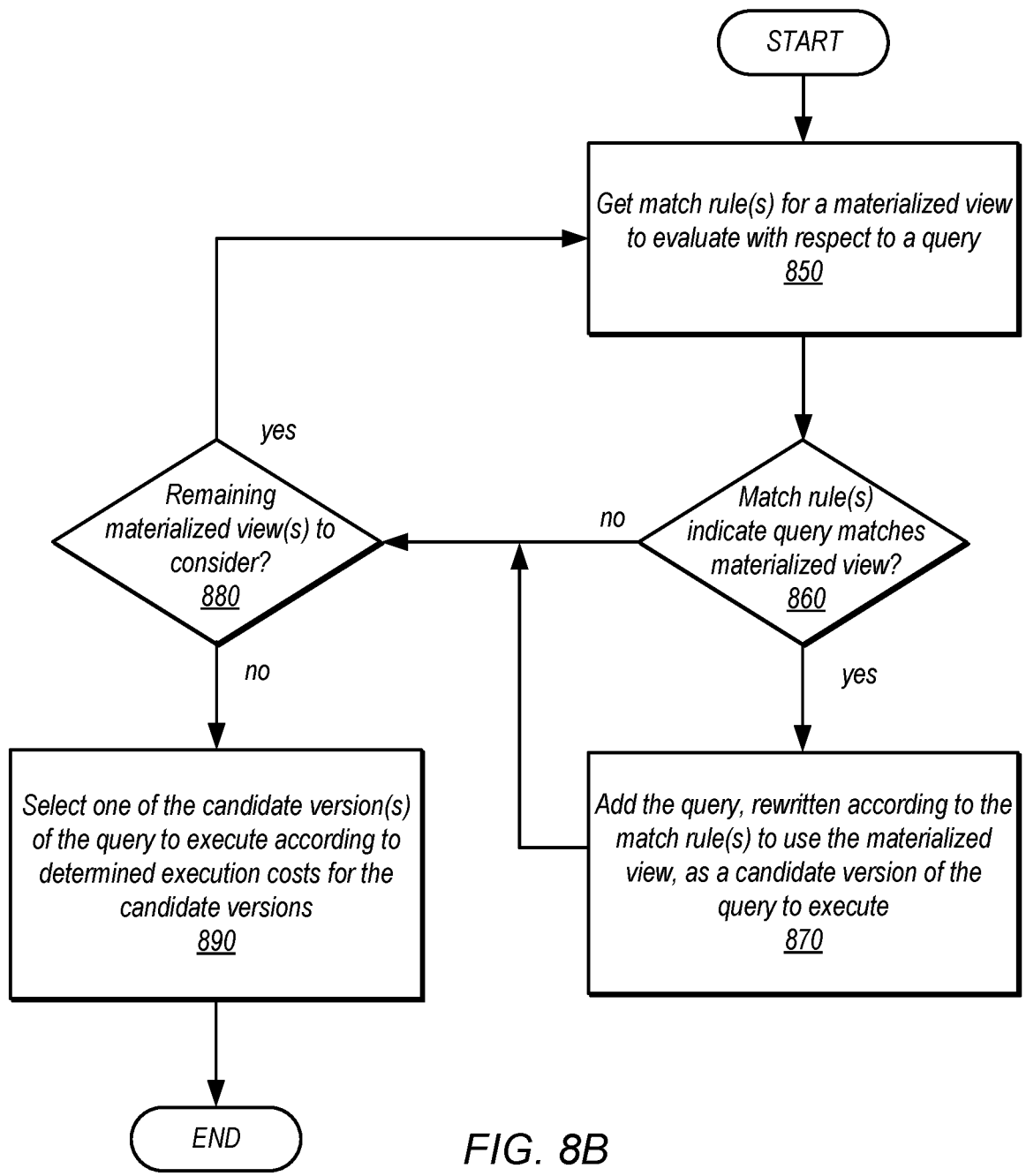

FIG. 8B is another high-level flowchart illustrating methods and techniques to implement evaluating match rules for materialized views, according to some embodiments. Like in FIG. 8A, as indicated at 850, match rule(s) for a materialized view may be retrieved to evaluate with respect to a query, in some embodiments. For example, match rule(s) for existing materialized views may be randomly selected. In some embodiments, materialized views may be considered in parallel, such that match rules for multiple different materialized views may be retried. In some embodiments, materialized views may be evaluated according to a determine order. For example, materialized views themselves can be ordered independently of the query to be rewritten based on how general they are. For example, a more specific materialized view may be more performant and therefore should be preferred over a more general materialized view that includes the more specific materialized view. In another example, a performance benefit for different materialized views may be determined for the received query to determine an order for evaluating materialized views.

As indicated at 860, if the match rule(s) indicate that a query matches the materialized view (e.g., by satisfying various logical statements or other operations specified in the match rule, such as matching a source, operation with respect to sources, etc.), then, the query may be rewritten according to the match rule(s) to use the materialized view, as indicated at 870, and added as a candidate version of the query to execute. If other materialized views remain to be considered (e.g., according to the ordering or according to random search that tracks which materialized views have been considered or not, then the evaluation may repeated, as indicated by the positive exit from 880 to 850. In this way, multiple rewrites to generate different candidate versions of the query may be performed.

When no more materialized views remain, a selection of one of the candidate versions of the query to may be made to execute the rewritten query of the selected candidate, as indicated at 890, in various embodiments. Execution costs for the candidate versions may be determined (e.g., using cost optimization techniques, such as various statistics to weight different types of operations to different data sources, similar to cost optimizer 532 in FIG. 5) and compared, in various embodiments. A least costly one of the candidate versions may then be selected, for example.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Embodiments of dynamic generation of match rules for rewriting queries to use materialized views as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those of dynamic match rule generation and query rewriting for materialized views using the generated match rules as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 9:
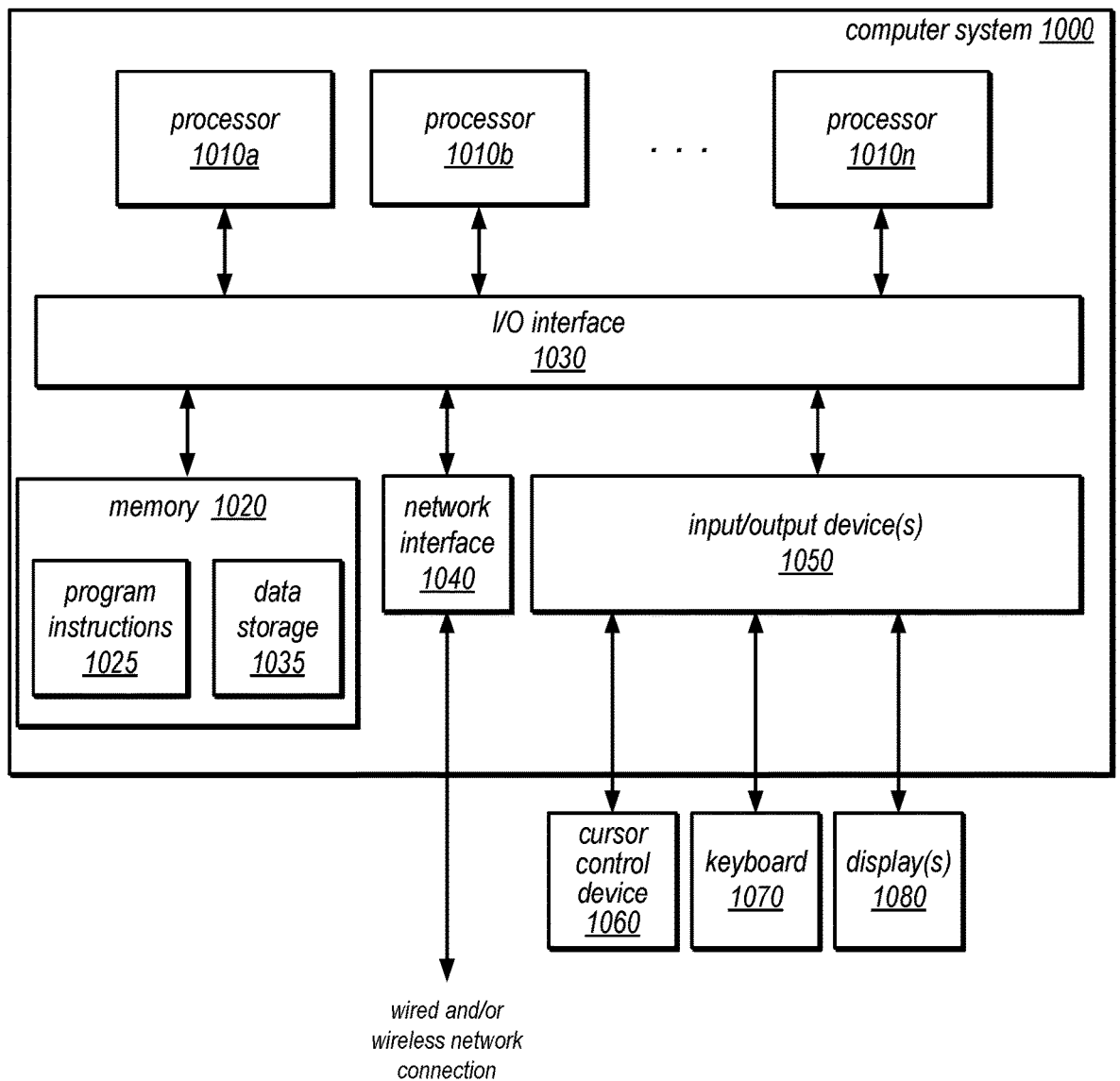
FIG. 9 illustrates an example system to implement the various methods, techniques, and systems described herein, according to some embodiments.

As shown in FIG. 9, memory 1020 may include program instructions 1025, may implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and a memory, storing program instructions that when executed by the at least one processor, cause the at least one processor to implement a database system, configured to:
   receive a request to create a materialized view from one or more database tables;
   as part of creating the materialized view, generate one or more rules specific to the materialized view according to one more operators used to generate the materialized view according to a materialized view definition received as part of the request, wherein the one or more rules specific to the materialized view indicate (i) whether a given query can use the materialized view and (ii) how to rewrite the given query to use the materialized view;
   receive a new query;
   execute the new query to return a result, wherein to execute the new query the database system is configured to:
      evaluate the new query with respect to the one or more rules to determine that the new query can use the materialized view; and
      rewrite the new query to use the materialized view according to the one or more rules to return the result based, at least in part, on the materialized view.

2. The system of claim 1, wherein to generate the one or more rules specific to the materialized view according to the one more operators used to generate the materialized view according to the materialized view definition received as part of the request, the database system is configured to:
   generate an operation tree to create the materialized view according to the materialized view definition;
   traverse the operation tree starting from a lowest level to apply one or more generation rules corresponding to one or more operations identified by the traversing of the operation tree to generate the one or more rules.

3. The system of claim 1, wherein to execute the new query, the database system is further configured to apply to the new query, by the database system, a second one or more rules that indicate (i) whether the given query can use a second materialized view and (ii) how to rewrite the given query to use the second materialized view, wherein the applying determines that the new query can use the second materialized view and rewrites the new query to use the second materialized view.

4. The system of claim 1, wherein the database system is a data warehouse service implemented as part of a provider network and wherein the request to create the materialized view is received via an interface for the data warehouse service that enables automatic query rewrites using the materialized view.

5. A method, comprising:
   generating, by a database system, one or more rules specific to the materialized view according to one more operators used to generate the materialized view according to a materialized view definition, wherein the one or more rules specific to the materialized view indicate (i) whether a given query can use a materialized view and (ii) how to rewrite the given query to use the materialized view;
   applying, by the database system, the one or more rules to a new query to:
      determine that the new query can use the materialized view; and
      rewrite the new query to use the materialized view; and
   executing, by the database system, the rewritten new query to return a result.

6. The method of claim 5, wherein generating the one or more rules specific to the materialized view according to one more operators used to generate the materialized view according to the materialized view comprises:
   generating an operation tree to create the materialized view according to the materialized view definition;
   traversing the operation tree starting from a lowest level to apply one or more generation rules corresponding to one or more operations identified by the traversing of the operation tree to generate the one or more rules.

7. The method of claim 5, further comprising receiving a request that causes an update to a configuration used to generate the one or more rules before generating the one or more rules.

8. The method of claim 5, further comprising applying to the new query, by the database system, a second one or more rules that indicate (i) whether the given query can use a second materialized view and (ii) how to rewrite the given query to use the second materialized view, wherein the applying determines that the new query can use the second materialized view and rewrites the new query to use the second materialized view.

9. The method of claim 5, further comprising rewriting the new query to cause the new query to be able to use the materialized view before applying the one or more rules to the new query.

10. The method of claim 5, further comprising:
   applying to the new query, by the database system, a second one or more rules that indicate (i) whether the given query can use a second materialized view and (ii) how to rewrite the given query to use the second materialized view, wherein the applying determines that the new query cannot use the second materialized view.

11. The method of claim 5, wherein the new query does not include a reference to the materialized view.

12. The method of claim 5, wherein the applying of the one or more rules to the new query is performed after selecting the materialized view based on respective performance benefit values determined for a plurality of materialized views, including the materialized view, with respect to the new query.

13. The method of claim 5, wherein the rewritten new query is one of a plurality of candidate versions of the new query generated for a plurality of different rules for a plurality of different materialized views, including the materialized view, and wherein the method further comprises selecting the one candidate version to execute based on a comparison of respective execution costs determined for the plurality of candidate versions of the new query.

14. One or more non-transitory, computer-readable storage media, storing program instructions that when executed on or across one or more computing devices cause the one or more computing devices to implement:
   generating, by a database system, one or more rules specific to the materialized view according to one more operators used to generate the materialized view according to a materialized view definition received as part of the request, wherein the one or more rules specific to the materialized view indicate (i) whether a given query can use a materialized view and (ii) how to rewrite the given query to use the materialized view;
   after generating the one or more rules, receiving a new query;

applying, by the database system, the one or more rules to the new query to:
  determine that the new query can use the materialized view; and
  rewrite the new query to use the materialized view; and
executing, by the database system, the rewritten new query to return a result.

15. The one or more non-transitory, computer-readable storage media of claim 14, wherein, in generating the one or more rules specific to the materialized view according to one more operators used to generate the materialized view according to the materialized view definition, the program instructions cause the one or more computing devices to implement:
  generating an operation tree to create the materialized view according to materialized view definition;
  traversing the operation tree starting from a lowest level to apply one or more generation rules corresponding to one or more operations identified by the traversing of the operation tree to generate the one or more rules.

16. The one or more non-transitory, computer-readable storage media of claim 14, storing further instructions that when executed on or across the one or more computing devices, cause the one or more computing devices to further implement applying to the new query, by the database system, a second one or more rules that indicate (i) whether the given query can use a second materialized view and (ii) how to rewrite the given query to use the second materialized view, wherein the applying determines that the new query can use the second materialized view and rewrites the new query to use the second materialized view.

17. The one or more non-transitory, computer-readable storage media of claim 14, storing further instructions that when executed on or across the one or more computing devices, cause the one or more computing devices to further implement rewriting the new query to cause the new query to be able to use the materialized view before applying the one or more rules to the new query.

18. The one or more non-transitory, computer-readable storage media of claim 14, after determining that the new query can use the materialized view as part of applying the one or more rules, excluding other materialized views from consideration to rewrite the new query.

19. The one or more non-transitory, computer-readable storage media of claim 14, storing further instructions that when executed on or across the one or more computing devices, cause the one or more computing devices to further implement:
  receiving a second query;
  applying, by the database system, the one or more rules to the second query to:
    determine that the second query can use the materialized view; and
    rewrite the second query to use the materialized view;
  comparing a first query plan to execute the rewritten second query with a second query plan to execute the second query to select the second query plan to execute according to a cost optimization technique; and
  executing, by the database system, the second query plan to return a second result for the second query.

20. The one or more non-transitory, computer-readable storage media of claim 14, wherein the applying of the one or more rules to the new query is performed after selecting the materialized view according to an ordering for evaluating a plurality of materialized views, including the materialized view, with respect to the query.

* * * * *